L. WYGODSKY.
ANTIFREEZING PLUG.
APPLICATION FILED DEC. 23, 1920.
1,409,634.
Patented Mar. 14, 1922.
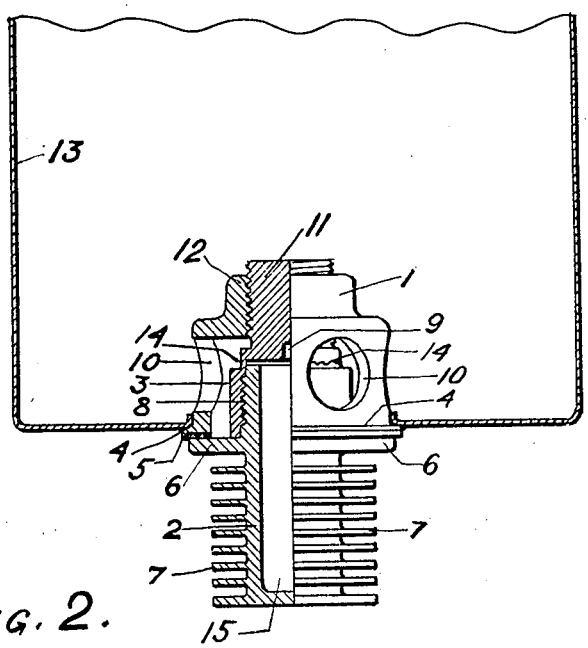
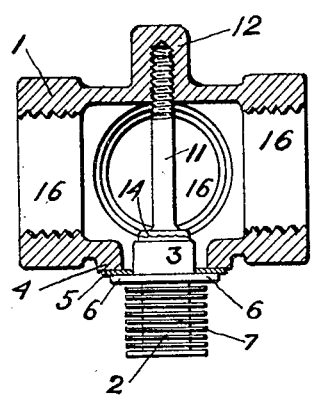
Leon Wygodsky, Inventor
William W. Varney
By Attorney

UNITED STATES PATENT OFFICE.

LEON WYGODSKY, OF BALTIMORE, MARYLAND.

ANTIFREEZING PLUG.

1,409,634.  Specification of Letters Patent.  Patented Mar. 14, 1922.

Application filed December 23, 1920. Serial No. 432,771.

*To all whom it may concern:*

Be it known that I, LEON WYGODSKY, a citizen of the United States, residing at Baltimore city, in the State of Maryland, have invented a new and useful Antifreezing Plug, of which the following is a specification.

My invention relates to antifreezing plugs, especially as applied to automobile radiators, piping systems and the like and has for its object the providing of means of automatic drainage of fluids at about the freezing temperature thereof.

A further object of my invention is the providing of an easily renewable plug which is automatically arranged to drain a fluid.

A further object of my invention is the providing of a water receptacle with an exposed plug, the fracture of which drains the receptacle.

A further object of my invention is the providing of a plug which can be easily fixed to a radiator or water jacket of an automobile, engine or other machine, water piping or any other water container exposed to the changing temperature of the atmosphere, and which plug will automatically drain the system at about a freezing temperature of the fluid.

With the foregoing and other objects in view, my invention consists of the novel construction, combination and arrangement of parts as hereinafter specifically described and illustrated in the accompanying drawing, wherein is shown the preferred embodiment of my invention, but it is understood that changes, variations and modifications can be resorted to which come within the scope of the claims hereunto appended.

In the drawing of the herein described embodiment of my invention, Figure 1 represents the assembled plug partly in section attached to the bottom of a radiator. Fig. 2, shows my improved plug as applied to water pipes.

Similar numerals refer to similar parts throughout the several views.

1 is the outer casing of my improved plug which is secured to the water receptacle, such as a radiator or jacket as shown in Fig. 1 by soldering or in any suitable manner. In Fig. 2 it forms a part of the pipe system. In either case it is provided with seat 4 against which flange 6 of plug 2 may be secured, 5 being an intermediate gasket if desired. In case of water piping, the plug is inserted in the fittings and the fitting itself (a T for example takes the place of outer casing 1) as shown in Fig. 2.

2 is the plug proper and forms the container 15 of the safety fluid and is provided with a plug cap 3 and is also provided with a weakened or reduced portion 14. The plug cap 3 hermetically closes the plug sealing the safety fluid therein. The exposed portion of plug 2 is provided with radiating ribs 7. 8 is the threaded portion of plug 2 upon which cap 3 is secured. Cap 3 is provided with a threaded portion 11 projecting from the head thereof on the inside of which is slot 9 for the purpose of inserting a screw driver when it is desired to unscrew the same after rupture. 10 are openings in outer casing 1 for drainage purposes.

12 is the threaded portion of outer casing 1 in which is secured extended portion 11. 16 are the three branches of the T shown in Fig. 2.

The operation of my invention is as follows—

My improvement is intended to take the place of drainage cocks and at the same time providing a safety device. As described above, outer casing 1 is permanently secured to the part to be drained or protected.

The safety device includes a safety plug 2 containing the safety fluid, which fluid should be such as will freeze and expand at a temperature at or above the freezing temperature of the fluid in the container. In the case of automobile radiators supplied with ordinary water, distilled water should be used as a safety fluid. In containers of other fluids a different safety fluid of a lower freezing temperature might be desired. Cap 3 is securely screwed and seated on to plug 2, hermetically sealing the safety fluid.

The above unit plug 2 and cap 3 as assembled when withdrawn from threaded portion 12 drains the receptacle, and when screwed into threaded portion 12 sufficient to make a tight joint between seat 4 and flange 6 affords the protection desired, it being in an exposed position and provided with radiating ribs 7. The safety fluid in chamber 15 will necessarily be cooler than the fluid in the container, and all other matters being equal would freeze first on a lowering temperature.

The safety fluid in chamber 15 upon freezing expands causing the weakest portion of its chamber to break. The weakest portion is reduced portion 14, which upon breaking releases safety plug 2 from extended position 11 which holds it in place, thus allowing it to drop off and the drainage of the receptacle to take place.

The extended portion 11 may then be removed by the insertion of a screw driver in slot 9.

Having thus described my invention, what I claim and desire to secure by Letters Patent is—

1. An antifreezing safety plug comprising an outer casing attachable to a fluid container, a safety fluid containing plug body closing the outer casing and exposed to the outer atmosphere and a plug cap hermetically sealing the fluid in the plug body, which cap serves for connecting same to the outer casing.

2. An antifreezing safety plug comprising an outer casing attachable to a fluid container and provided with a seat, a safety fluid containing plug body closing the outer casing against said seat and exposed to the outer atmosphere and a plug cap hermetically sealing the fluid in the plug body, which cap serves for connecting same to the outer casing.

3. An antifreezing safety plug comprising a safety fluid chamber in a member provided with means for making a joint in an opening in a receptacle to be protected, means for securing said member in said opening consisting of a threaded portion of a member projecting from said first named member and secured within said receptacle and means provided at a predetermined point on the second named member between said threaded portion and said joint to determine cleavage upon the freezing of the safety fluid contained in said chamber.

4. Means for releasing the contents of a receptacle consisting of a safety fluid chamber adapted to be attached to the receptacle and be exposed jointly to the temperature of the contents of said receptacle and the exterior temperature, said chamber adapted to be detached from said receptacle upon the freezing of the fluid in said chamber.

5. Means for releasing the contents of a receptacle consisting of a safety fluid chamber adapted to be attached to the receptacle and be exposed jointly to the temperature of the contents of said receptacle and the exterior temperature, the exterior portion thereof being provided with radiating projections, said chamber adapted to be detached from said receptacle upon the freezing of the fluid within said chamber.

6. A container and means within the container for securing a safety plug, a safety plug closing an opening in said container and attached to said securing means, said securing means adapted to be separated from said plug between said securing means and the closing means at a pre-determined temperature of the said plug.

7. A container and means within the container for securing a safety plug, a safety plug closing an opening in said container and attached to said securing means, said securing means adapted to be separated from said plug between said securing means and the closing means at a pre-determined temperature of the plug, and means for withdrawing said securing means consisting of a slot therein.

8. In a safety device, a plug, a cap forming a joint thereon provided with a threaded projection from the head thereof and a weakened portion near the head thereof.

9. In a safety device, a plug, a cap forming a joint thereon and provided with a threaded projection from the head thereof and a weakened portion near the head thereof, said head being provided with an internal slot.

LEON WYGODSKY.

Witnesses:
 IVAN GREENEBAUM,
 WILLIAM W. VARNEY.